(12) United States Patent
McClure et al.

(10) Patent No.: US 8,209,947 B2
(45) Date of Patent: Jul. 3, 2012

(54) SIMPLIFIED, TOOLLESS PICK-UP TINE MOUNTING

(75) Inventors: John R. McClure, New Holland, PA (US); Roger D. Mast, Jr., Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/877,957

(22) Filed: Sep. 8, 2010

(65) Prior Publication Data

US 2012/0055136 A1    Mar. 8, 2012

(51) Int. Cl.
*A01D 89/00* (2006.01)
(52) U.S. Cl. .......................................... 56/364
(58) Field of Classification Search ............ 56/400, 56/360, 364; 172/643, 707
See application file for complete search history.

(56) References Cited

U.S. PATENT DOCUMENTS

| | | | |
|---|---|---|---|
| 2,957,299 A * | 10/1960 | Gustafson et al. | 56/400 |
| 2,989,835 A * | 6/1961 | Johnston | 56/400 |
| 3,066,470 A | 12/1962 | Johnston | |
| 3,468,109 A | 9/1969 | Reimer | |
| 3,613,346 A | 10/1971 | Hubbard | |
| 3,616,631 A | 11/1971 | Quam | |
| 4,481,758 A * | 11/1984 | Fishbaugh | 56/400 |
| 4,520,620 A | 6/1985 | Gessel et al. | |
| 4,882,899 A | 11/1989 | Jasper et al. | |
| 5,271,213 A | 12/1993 | Von Allwoerdan | |
| 5,426,928 A | 6/1995 | Frimml et al. | |
| 5,595,052 A | 1/1997 | Jasper et al. | |
| 6,199,357 B1 | 3/2001 | Bloom | |
| 6,397,573 B2 | 6/2002 | Majkrzak | |
| 2003/0126848 A1 | 7/2003 | Bickel | |

* cited by examiner

*Primary Examiner* — Thomas B Will
*Assistant Examiner* — Mai Nguyen
(74) *Attorney, Agent, or Firm* — Patrick M. Sheldrake

(57) ABSTRACT

An improved tine and tine connection device for removably connecting a tine to a pick-up reel tine bar in an agricultural harvesting machine. The improved tine incorporates an elastomeric portion interconnecting the tine fingers and the tine bar which enables limited tines movement relative to the tine bar. The elastomeric portion may also be shaped to fit around the tine bar enabling the elastomeric portion to also function as the tine mount. The tine mount is configured to enable installation by hand or using only simple tools and, once installed, provide sufficient connection strength to retain the tine in position during reel operation.

17 Claims, 3 Drawing Sheets

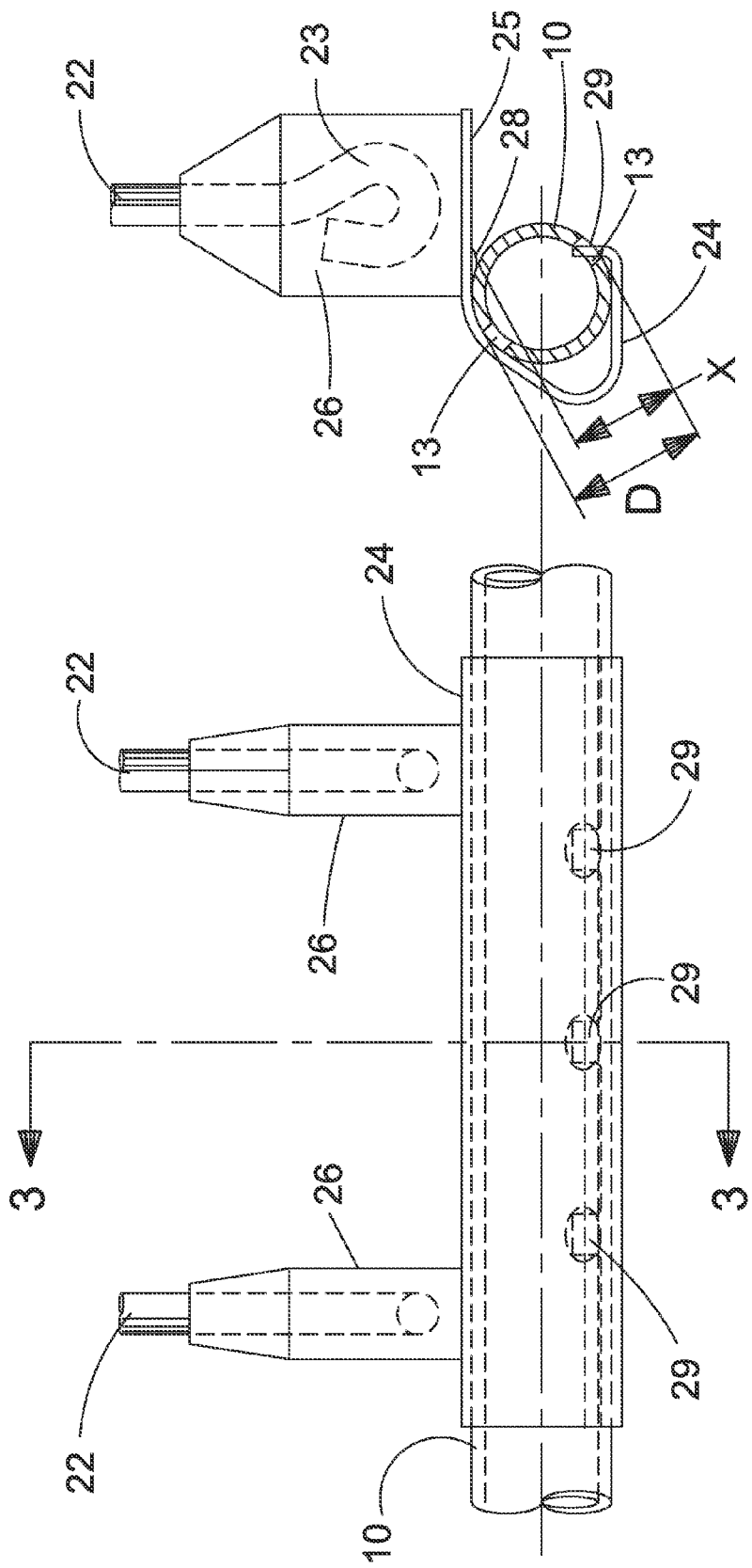

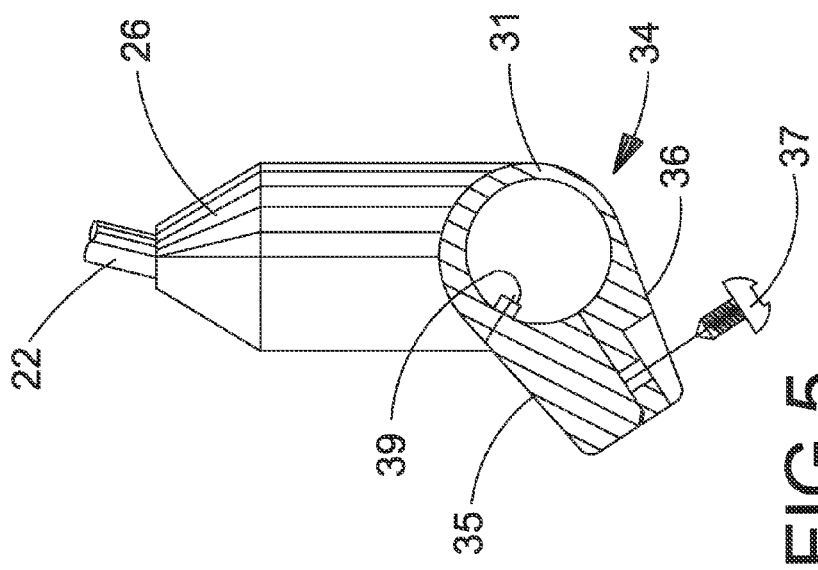
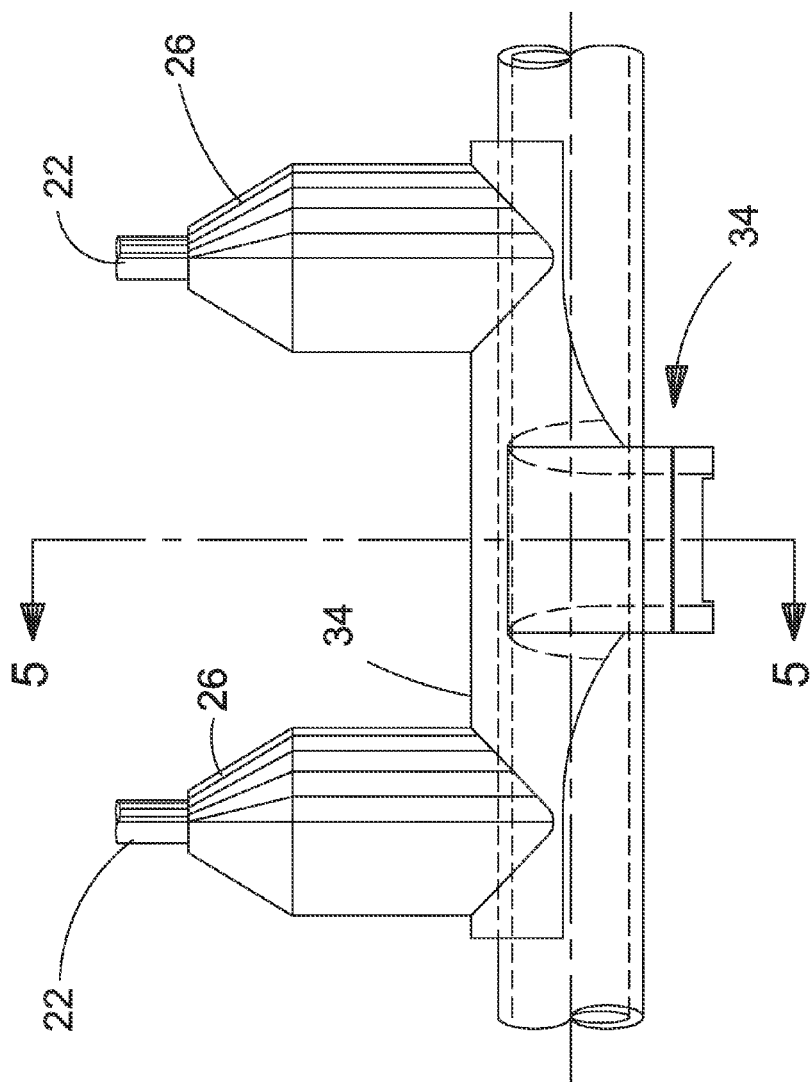

SIMPLIFIED, TOOLLESS PICK-UP TINE MOUNTING

BACKGROUND OF THE INVENTION

This invention relates generally to agricultural machines having a rotatable pick-up reel for lifting crop from the ground into the machine, and, more particularly, to an improved device for connecting individual tine assemblies to rotating tine bars of the pick-up reel.

Pick-up reels used in agricultural machine comprise a plurality of parallel tine bars arranged in a cylindrical pattern which is rotated about a central axis. Individual tines are connected to the bars and extend generally outwardly to engage the crop material. The tine bars may be individually rotated dependent upon the reel rotational position vary the position of the tines relative to the reel rotational position, such as for folding the tines inwardly at a point in the rotation to release the crop material for feed into the machine. Tines are typically connected to the tine bars using a variety of bolts, clips, or cast mounts, all of which increase the total part count of the reel and hence, increase production costs. Moreover, replacement of tines mounted in such a manner is often made more difficult as connection fasteners are prone to rusting in place.

It would be advantageous to have an alternate tine and/or tine mounting apparatus that could be installed and removed from a reel by hand or using only simple tools (e.g., a hammer or a screwdriver), yet provide sufficient connection strength to withstand the loading typically applied to the pick-up tines during machine operation. Still more advantages would be realized by an alternate tine mounting that relied on corrosion-resistant parts to reduce the likelihood of tines rusting in place.

SUMMARY OF THE INVENTION

Accordingly, the present invention, in any of the embodiments described herein, may provide one or more of the following advantages:

It is an object of the present invention to provide an improved mount for connecting a tine to a pick-up reel that may be removed or installed by hand without the use of tools.

It is a further object of the present invention to provide an improved tine mount for use on pick-up reels that may be removed or installed by hand using only simple tools, such as a screwdriver or a hammer.

It is a further object of the present invention to provide a tine for a pick-up reel that incorporates non-ferrous materials in the connection to reduce the likelihood that the tines will rust in place on the tine reel.

It is a further object of the present invention to provide an improved tine for a pick-up reel in which an elastomeric element disposed between the tine and the tine bar on the reel allows the tine to move under load.

It is a still further object of the present invention to provide an improved tine for a pick-up reel that allows limited tine movement, but maintains the tine orientation sufficiently fixed in relation to the tine bar for proper pick-up reel operation.

It is a still further object of the present invention to provide an improved tine and tine mounting device for connecting a tine to a pick-up reel that is compatible with current production tine reel configurations used in agricultural balers, windrowers, and other agricultural equipment using pick-up reels.

It is a still further object of the present invention to provide an improved tine and mounting arrangement for connecting a tine to a tine bar in a pick-up reel that is durable in construction, inexpensive of manufacture, carefree of maintenance, easily assembled, and simple and effective to use.

These and other objects are achieved in accordance with the instant invention by providing an improved tine assembly for removable connection to a pick-up reel tine bar in an agricultural harvesting machine. The improved tine assembly incorporates a flexible portion interconnecting pick-up tine fingers and a tine bar mount. The intermediate flexible member enables limited tine finger movement relative to the tine bar upon which the tine bar mount is affixed. The flexible member may also be shaped to fit around the tine bar enabling the member to also function as the tine bar mount. The tine mount is configured to enable installation by hand or using only simple tools and, once installed, provide sufficient connection strength to retain the tine in position during reel operation.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a side view showing one embodiment of the present tine assembly invention as installed on a tine bar;

FIG. 3 is section view taken along cut line 3-3 in FIG. 2;

FIG. 4 is a side view showing a second embodiment of the present tine assembly invention as installed on a tine bar; and FIG. 5 is section view taken along cut line 5-5 in FIG. 4.

DESCRIPTION OF THE PREFERRED EMBODIMENT(S)

Figure 1:
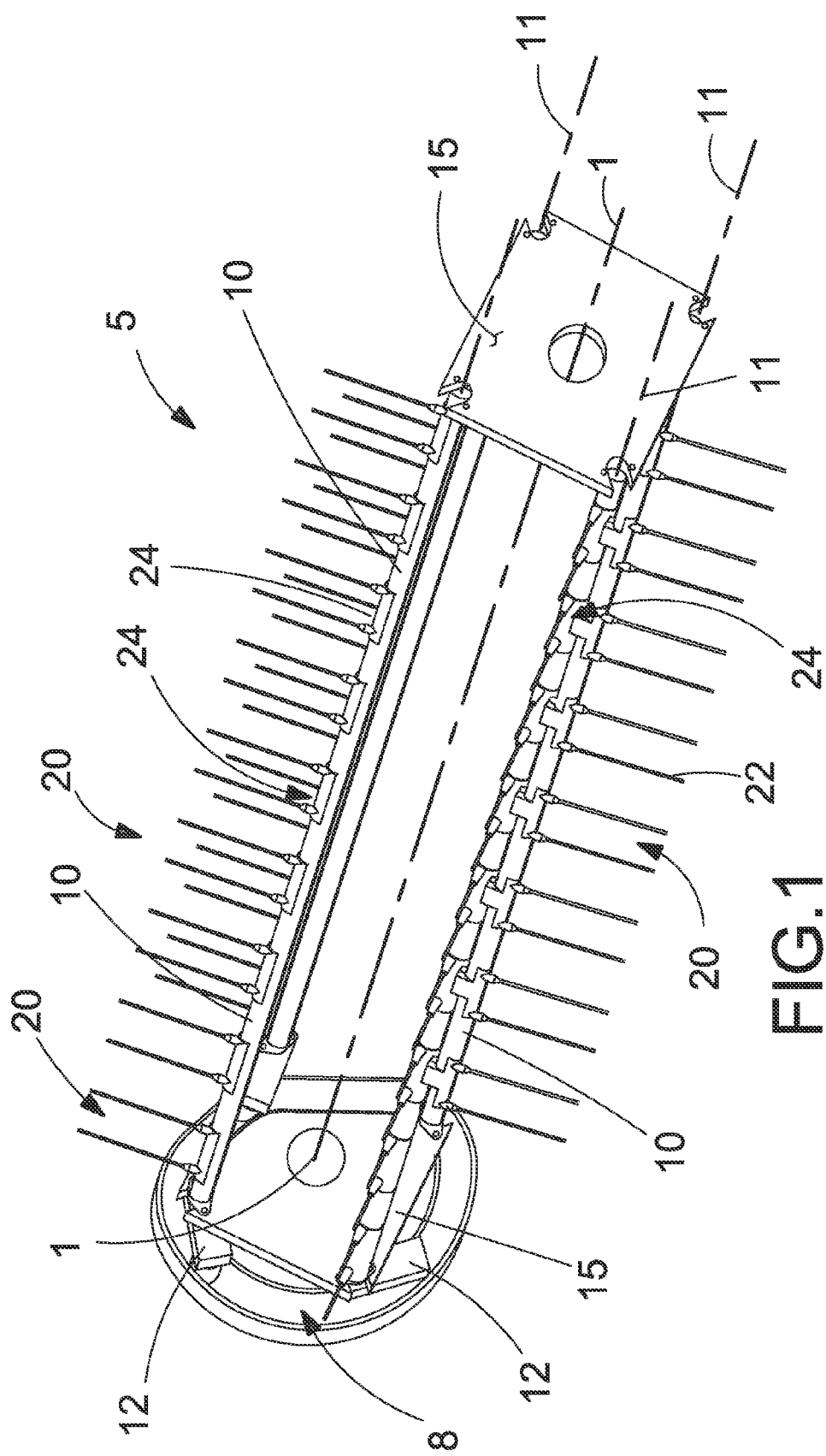
FIG. 1 is a partial perspective view of a pick-up reel assembly used in an agricultural harvester of the type on which the present invention is useful.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring now to the drawings and particularly to FIG. 1, a pick-up reel 5 of the type commonly used in agricultural harvesters is shown comprising a plurality of tine bars 10 disposed on tines axes 11 that are radially distanced from a central rotational axis 1 and distributed around a rotational circumference of the pick-up reel 5. Reels featuring three to six tine bars are common, though reels having greater numbers of tine bars are possible. The tine bars 10 are supported by a pair of opposing end caps 15 which fix the radial and lateral, position of the tine bars relative to the rotational axis 1. End caps 15 also enable the reel 5 to be rotatably connected to the machine and provide a convenient structure for receiving rotational power from the prime mover to rotate the reel. To each tine bar 10 is attached a plurality of tine assemblies 20 having tine fingers 22 which extend generally outwardly from the reel circumference defined by the rotational path of the tine bars 10. The tine fingers 22 in pick-up reels are generally made from a steel wire having a generally circular cross-sectional profile in order to withstand the structural loadings imposed on pick-up tines.

The tine bars 10 may also include followers 12 at one or both ends which engage a cam 8 in order to rotate the tine bars about their longitudinal axes 12 as the reel rotates thereby altering the angular extension of the tines 20 during rotation of the reel 5. Such features are generally included on machines in which the tines must be repositioned in order to aid in crop handling or to clear portions of the machine at some point on the tine path. In a typical baler application, the tines are ideally fully extended (substantially radially) in the portion of the rotation adjacent to the ground and angled toward amore tangential orientation in the portion of the reel rotation at which crop material is to be released from the reel.

Now referring to FIGS. 2 and 3 wherein one embodiment of the present tine assembly 20 is shown comprising a mounting bracket 24 having one or more flexible connectors 26 affixed thereto from which one or more tine fingers 22 extend. Flexible connector 26 is preferably formed from a resilient material, such as a flexible polymer or a synthetic elastomer, that will allow limited relative movement between the tine 22 and the mounting bracket 24. In the embodiment shown, flexible connector 26 is molded polyurethane rubber into which an end 23 of the tine finger 22 is embedded. Tine finger 22 is preferably formed from metal to provide the necessary strength for pick-up reel operation. Pick-up reel tines are subjected to significantly higher loads than those used on crop reels used for guiding crop into a header, such as those used on combine headers. Flexible connector 26 may be adhesively secured to mounting bracket 24, integrally molded around the mounting bracket, or secured by a mechanical connection so that the tine assembly 20 functions as an integral assembly.

Multiple tine assemblies 20 are secured to the tine bars 10 of reel 5 using a tool less mounting bracket 24 connection of the embodiment shown in FIGS. 2 and 3. Tine bars are generally cylindrically shaped having a diameter "D" (see FIG. 3) and have a plurality of tine retainers, preferably mounting holes 13, axially spaced apart along the length of the tine bars. In other known reel configurations, mounting holes 13 enable tines to be connected to the tine bars using bolted connectors. Mounting bracket 24 is configured to encircle more than half of the circumference of the tine bar to allow the tine assembly to be secured to the tine bar. Mounting bracket 24 has two generally opposing ends which encircle the tine bar 10 when the tine assembly 20 is installed. The first end includes a hook 29 which engages one of the holes 13 while the opposite end includes a detent tab 28 which secures the mounting bracket 24 in contact with the tine bar 10. The hook 29 and detent tab 28 are arranged on the mounting bracket to form a generally C-shape in which the spacing between the tab 28 and the hook 29 (shown as dimension "X" in FIG. 3) is less than the diameter "D" of the tine bar. Mounting bracket 24 is formed from a flexible material, such as steel, that allows the hook 29 and the detent 28 to be biased for toward one another so that the spacing between the hook 29 and the detent 28 is normally maintained at a distance less than the diameter of the tine bar 10, but may be spread apart to allow the hook and detent to be moved apart so that the mounting bracket may slide over the tine bar and allow the biasing force to keep the mounting bracket secured in position against the external periphery of the tine bar. Engagement of the hook 29 into a mounting hole 13 retains the tine assembly 20 laterally on the tine bar 10 and prevents rotation of the tine assembly engaged on the tine bar.

Referring finally to FIGS. 4 and 5, a second embodiment of the tine assembly 20 is presented in which mounting bracket 24 is replaced with a mounting clamp 34 to connect the tine assembly 20 to the tine bar 10. Mounting clamp 34 includes first and second ends 35, 36 and a wrap-around portion 31 which encircle the tine bar 10. The ends 35, 36 are held in contact by a fastener 37 so that when installed on a tine bar, the wrap-around portion 31 is in adjacent contact with the tine bar. A detent tab 39 is provided to engage holes 13 in the tine bar to retain the tine assembly in position laterally and to prevent the tine assembly from rotating around the tine bar. Mounting clamp 34 is preferably formed from a corrosion resistant material such as polyurethane, but may be formed from any suitably strong material including metals and polymers. As with the mounting bracket 24 described above, the flexible connector 26 may be molded to or adhesively connected to the mounting clamp 34. Alternatively, the flexible connector may be integrally formed from the same material as the clamp 34 which provides a highly corrosion resistant tine connector device featuring strong, steel tine fingers necessary for reliable and durable pick-up reel operation.

While tine bars 10 having circular cross-sections are presented herein, a skilled artisan will recognize that tine bars having other cross sections, such as polygonal cross sections, offer the same functionality provided the mounting bracket 24 or mounting clamp 34 interface is configured to match the cross section profile of the particular tine bars. Such variations are anticipated and considered within the scope and spirit of this invention. Reference to the diameter of a tine bar in connection with a non-circular cross-section generally means the spacing between opposite faces of the tine bar.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A tine assembly for connection to an elongate tine bar in a pick-up reel used on an agricultural baler:
   a base member configured to engage the tine bar, said base member having a first end portion and a second end portion separated by an intermediate portion configured to partially encircle the tine bar, said base member further having a plurality of inwardly extending retention tabs configured to engage retainer holes extending inwardly through an exterior surface of the tine bar such that movement along the length of the tine bar is substantially prevented;
   at least one tine finger, said at least one tine finger being formed from a first material; and
   a flexible member configured to connect said at least one tine finger to said base member, said flexible member being formed from a second material wherein the inwardly extending retention tabs are hooks located at the first end portion of the base member, the base member further comprising a protrusion at the second end portion of the base member configured for contact with an exterior diameter of the bar and the hook and further toward a center of the tine bar than the protrusion.

2. The tine assembly of claim 1, wherein said first material is steel and different from said second material.

3. The tine assembly of claim 2, wherein said second material is a flexible polymer.

4. The tine assembly of claim 3, wherein said flexible polymer is an elastomer.

5. The tine assembly of claim 3, wherein said flexible polymer is a polyurethane rubber.

6. The tine assembly of claim 1, wherein said first end portion and said second end portion are arranged in a general C shape and sized such that a straight line distance between the end portions is less than the diameter of the tine bar, such that when the base member is in an engaged position on the bar, the hook and protrusion are configured to grasp the bar in a snap fit.

7. The tine assembly of claim 1, in combination with the tine bar wherein the tine bar is circular and said first end and said second end portions are configured to grasp the tine bar in a snap fit when the hook is positioned within the hole of the tine bar and the protrusion applies a force against the outer surface diameter of the tine bar.

8. The tine assembly of claim 6, wherein said base member and hook are is formed from said first material.

9. A baler tine assembly for connection to a pickup of an agricultural baler comprising:
   a circular tine bar having diameter and a plurality of mounting holes extending inwardly through an exterior surface of the tine bar spaced-apart along the length of the tine bar,
   a base member configured for removable engagement of the tine bar, said base member having a first end, a second end, and an intermediate portion extending therebetween in a general C-shape to at least partially encircle the tine bar when engaged, said base member further having an inwardly extending rigid retention tab engaging one of the plurality of mounting holes such that movement along the length of the tine bar and rotation about the tine bar is substantially prevented;
   at least one tine finger formed from a first material; and
   a flexible member configured to connect said at least one tine finger to said base member and retain said at least one tine finger in a position extending generally radially away from the tine bar when said base member is engaged on the tine bar, said flexible member being formed from a second material different from said first material which allows sufficient movement of said at least one tine finger to reduce breakage of said tine assembly while limiting movement of said at least one tine finger to enable said tine assembly to elevate crop material from the ground.

10. The tine assembly of claim 9, wherein said first material is steel.

11. The tine assembly of claim 10, wherein said second material is a flexible polymer.

12. The tine assembly of claim 11, wherein said flexible polymer is an elastomer.

13. The tine assembly of claim 11, wherein said flexible polymer is polyurethane.

14. The tine assembly of claim 9, wherein said base member is generally C-shaped and the separation between said first and second ends is less than the diameter of the tine bar to maintain said base member in adjacent contact with the tine bar when the tine assembly is installed, the first end configured to engage with one of the mounting holes of the tine bar and a second end of the tine bar including a projecting portion arranged to apply a force against an exterior surface of the tine bar.

15. The tine assembly of claim 9, wherein said first end and said second end are held together in a fastened position such that said intermediate portion encircles and contacts the full perimeter of the tine bar and by drawing said first end and said second end together, the first and second end each having protruding portions wherein a fastening mechanism spans between the protrusions when the base portion is in a fastened position.

16. The tine assembly of claim 11 wherein the inwardly extending retention tab configured to engage a mounting hole in the tine bar is a hook located in a first end portion of the base member, the base member further comprising a protrusion in a second end of the base member configured for contact with an exterior diameter of the tine bar.

17. The tine assembly of claim 16, wherein the hook and protruding portion are configured to grasp the bar in a snap fit without the use of threaded fastening devices.

* * * * *